(12) United States Patent
Jordan et al.

(10) Patent No.: US 8,788,710 B2
(45) Date of Patent: *Jul. 22, 2014

(54) MANAGED OBJECT MEMBER ARCHITECTURE FOR SOFTWARE DEFINED RADIO

(75) Inventors: Thomas L. Jordan, Melbourne, FL (US); Ronald P. Adkins, Melbourne, FL (US)

(73) Assignee: Treble Investments Limited Liability Company, Wilmington, DE (US)

( * ) Notice: Subject to any disclaimer, the term of this patent is extended or adjusted under 35 U.S.C. 154(b) by 778 days.

This patent is subject to a terminal disclaimer.

(21) Appl. No.: 12/792,390

(22) Filed: Jun. 2, 2010

(65) Prior Publication Data

US 2010/0242021 A1 Sep. 23, 2010

Related U.S. Application Data

(62) Division of application No. 10/837,771, filed on May 3, 2004, now Pat. No. 7,757,211.

(51) Int. Cl.
*G06F 15/16* (2006.01)
(52) U.S. Cl.
USPC .......................................................... 709/246
(58) Field of Classification Search
None
See application file for complete search history.

(56) References Cited

U.S. PATENT DOCUMENTS

| | | | |
|---|---|---|---|
| 5,506,837 A | 4/1996 | Sollner et al. | |
| 5,613,201 A | 3/1997 | Alford et al. | |
| 5,960,344 A | 9/1999 | Mahany | |
| 5,970,410 A | 10/1999 | Carney et al. | |
| 6,035,192 A | 3/2000 | Garner et al. | |
| 6,057,943 A | 5/2000 | Kweon et al. | |
| 6,151,332 A | 11/2000 | Gorsuch et al. | |
| 6,188,873 B1 | 2/2001 | Wickman et al. | |
| 6,259,672 B1 | 7/2001 | Lohrbach | |
| 6,292,671 B1 | 9/2001 | Mansour | |
| 6,311,072 B1 | 10/2001 | Barclay et al. | |
| 6,404,775 B1 | 6/2002 | Leslie et al. | |
| 6,449,264 B1 | 9/2002 | Lehtinen et al. | |
| 6,549,949 B1 * | 4/2003 | Bowman-Amuah | 709/236 |
| 6,662,010 B1 | 12/2003 | Tseitlin et al. | |
| 6,665,536 B1 | 12/2003 | Mahany | |

(Continued)

OTHER PUBLICATIONS

Notice of Allowance from corresponding U.S. Appl. No. 10/837,771 dated Mar. 3, 2010.

(Continued)

*Primary Examiner* — Farid Homayounmehr
*Assistant Examiner* — Olanrewaju Bucknor
(74) *Attorney, Agent, or Firm* — Brundidge & Stanger, P.C.

(57) ABSTRACT

A method for managing a flow of information in an object oriented software environment. A master MOM (130) and at least a second MOM (135) can be initialized. A third MOM (140) also can be initialized. A change resolution (150), which includes data correlating to a change in a device in a system, can be automatically propagated from the second MOM to the master MOM. The change can be a change in configuration data or a change in a run-time state of the device. Data in the master MOM correlating to the change resolution can be updated. In response to the change resolution, a change publication (160), which includes data correlating to the change resolution, can be automatically propagated from the master MOM to at least the third MOM. Data in the third MOM correlating to the change publication can be updated.

20 Claims, 4 Drawing Sheets

(56) References Cited

U.S. PATENT DOCUMENTS

| | | | |
|---|---|---|---|
| 6,795,686 | B2 | 9/2004 | Master et al. |
| 6,904,023 | B2 | 6/2005 | Albal et al. |
| 6,912,230 | B1 * | 6/2005 | Salkini et al. ............... 370/466 |
| 7,150,015 | B2 * | 12/2006 | Pace et al. ................... 717/176 |
| 7,174,165 | B2 | 2/2007 | Lee |
| 7,203,515 | B2 | 4/2007 | Min et al. |
| 7,221,660 | B1 | 5/2007 | Simonson et al. |
| 7,460,510 | B2 | 12/2008 | Olivier et al. |
| 8,493,442 | B2 * | 7/2013 | Fernandez et al. ............ 348/143 |
| 2002/0027930 | A1 | 3/2002 | Huh et al. |
| 2002/0132635 | A1 | 9/2002 | Girard et al. |
| 2002/0137514 | A1 | 9/2002 | Mitsugi et al. |
| 2003/0041138 | A1 | 2/2003 | Kampe et al. |
| 2003/0054763 | A1 | 3/2003 | Judd et al. |
| 2003/0061323 | A1 | 3/2003 | East et al. |
| 2003/0119498 | A1 | 6/2003 | Haas et al. |
| 2003/0139180 | A1 | 7/2003 | McIntosh et al. |
| 2003/0158954 | A1 | 8/2003 | Williams |
| 2004/0002351 | A1 | 1/2004 | Upp et al. |
| 2004/0057405 | A1 | 3/2004 | Black et al. |
| 2004/0121729 | A1 | 6/2004 | Herndon et al. |
| 2004/0139193 | A1 | 7/2004 | Refai et al. |
| 2004/0230674 | A1 | 11/2004 | Pourheidari et al. |
| 2004/0230943 | A1 | 11/2004 | Pourheidari et al. |
| 2004/0249915 | A1 | 12/2004 | Russell |
| 2005/0055689 | A1 | 3/2005 | Abfalter et al. |
| 2005/0083971 | A1 | 4/2005 | Delaney et al. |
| 2005/0120100 | A1 | 6/2005 | Dufour et al. |
| 2005/0153720 | A1 | 7/2005 | White et al. |
| 2005/0254464 | A1 | 11/2005 | Patel et al. |
| 2006/0052124 | A1 | 3/2006 | Pottenger et al. |
| 2008/0031275 | A1 | 2/2008 | Janky et al. |

OTHER PUBLICATIONS

Office Action dated Sep. 14, 2010 for U.S. Appl. No. 10/980,044.
USPTO; Final Office Action dated Mar. 24, 2011 in U.S. Appl. No. 10/980,044.
Advisory Action dated May 4, 2010 for U.S. Appl. No. 10/980,044.
Final Office Action dated Feb. 22, 2010 for U.S. Appl. No. 10/980,044.
Office Action dated Aug. 18, 2009 for U.S. Appl. No. 10/980,044.
Final Office Action dated Apr. 1, 2009 for U.S. Appl. No. 10/980,044.
Office Action dated Oct. 17, 2007 for U.S. Appl. No. 10/980,044.

* cited by examiner

MANAGED OBJECT MEMBER ARCHITECTURE FOR SOFTWARE DEFINED RADIO

CROSS-REFERENCE TO RELATED APPLICATIONS

This application is a divisional application of U.S. Ser. No. 10/837,771 filed on May 3, 2004, and entitled "Managed Object Member Architecture for Software Defined Radio," the disclosure of which is incorporated herein by reference.

BACKGROUND

1. Statement of the Technical Field

The inventive arrangements relate to software defined radios, and more particularly to data management within software defined radio systems.

2. Description of the Related Art

Modern wireless communications systems often include software applications for managing associated equipment. The equipment for a particular communications system is typically organized in a tree-like hierarchy representing the nodes of a communications system. For example, the communications system can include base station systems (BSS's), each of which contain sites employing a base transceiver station (BTS). Each site can contain sectors, and each sector can contain cells.

The controlling nerve center of the communications system is the operations maintenance center-radio (OMC-R). All configuration information about the communications system is persisted in the OMC-R. Through an OMC-R client, an operator can change the configuration states of any equipment in the communications system. The operator also can observe the health and status of the running system by viewing equipment run-time states and configurations.

In such a system there is a significant amount of data replication. For instance, in addition to being present on the site itself, the run-time states and configuration data of a particular site are replicated in the site's parent BSS, in the OMC-R server, and each OMC-R client (user interface). The BSS can process such information when executing functions to which the information is relevant, for example when determining when to, and when not to, hand over a call to a particular site. Additionally, the OMC-R client can present the replicated information to a system operator for evaluation.

In general, the replication of data helps to maintain high reliability and high performance in the communications system. For instance, a BSS typically needs configuration data from the OMC-R to operate, yet the BSS must continue to function even if the OMC-R is offline or otherwise unreachable. The use of replicated data enables such independence of operation. Additionally, the use of replicated data helps minimize the frequency of data exchanges between nodes of the system, thus reducing the impact of system latency, which otherwise may be unacceptable.

Although the benefits to using replicated data in a system is clear, such use of replicated data also presents considerable challenges. The most basic issue is that, as changes occur within the system, data can become stale and inconsistent with corresponding data in other nodes. For example, when an operator uses the OMC-R client to change the administrative state of a BTS from unlocked to locked, the corresponding data in nodes where the data is replicated will not reflect the change unless updated.

Updates can occur in a pull architecture or in a push architecture. In the pull architecture, each node is responsible for retrieving its own data updates. However, the node does not necessarily know when a data change has occurred that will effect the replicated data contained in the node. Periodic mechanisms (for example, polling) sometimes are used to initiate data updates in each node, but this approach presents two competing issues, namely latency and wasted network bandwidth. Each time a data update occurs, valuable bandwidth is used. Thus, although a short period can be used between data updates to minimize system latency, such an update scheme will certainly waste system bandwidth. If a longer period is used between data updates to conserve bandwidth, data can become stale due to the longer latency.

In the push architecture, the responsibility of updating other nodes is typically assigned to the node that has changed or the designated master node (containing the official superset of all replicated data). The responsible node sends an update message directly to each node that replicates the changed data. Since, the update message is triggered directly by the change itself, only one message will be sent to each node for each change. The result is that latency and network bandwidth usage are minimized. However, it is often difficult to implement a scheme that properly tracks each of the nodes that replicate the changed data item, especially in complex systems. To deal with that issue, the system architect may use a forwarding scheme such that when any data item is changed it sends a message to a predetermined node. The predetermined node then updates its data and forwards it to another node or nodes in a predetermined sequence. Thus, the data updates propagate through the system until the message reaches the final nodes that require the data updates. This approach is very challenging to implement, however, especially while trying to implement an architecture that is cohesive, loosely coupled and maintainable.

SUMMARY

The present invention relates to a method for managing a flow of information in an object oriented software environment. Data encapsulated by a managed object member (MOM) can be automatically updated when replicated data encapsulated by other remotely located MOMs change. The updates can occur as soon as the replicated data changes occur, thus minimizing system latency and insuring system-wide consistency of replicated data within a system. Moreover, since the data updates propagate automatically, polling mechanisms are not required to check for data updates. The elimination of such polling mechanisms minimizes the use of valuable network bandwidth.

In operation, a master MOM and at least a second MOM having a subset or all of the data contained in the master MOM can be initialized. A third MOM also can be initialized. The second and third MOMs can be initialized from the master MOM, a parent MOM, a backup MOM, or a persistent data store. A change resolution, which includes data correlating to a change in a device in a system, can be automatically propagated from the second MOM to the master MOM. The change can be a change in configuration data or a change in a run-time state of the device. A change resolution which includes data correlating to a change in a second device in a system also can be automatically propagated from a third or a fourth MOM to the master MOM. Data in the master MOM correlating to the change resolutions can be updated. In one arrangement, the change resolutions can be validated before the updates occur. The master MOM also can update data correlating to the change resolutions in a persistent data store.

The second MOM and the third MOM can subscribe to a data topic with the master MOM or with a parent MOM. The subscribing step can be performed after at least one object is initialized. In response to the change resolution, a change publication, which includes data correlating to the change resolution, can be automatically propagated from the master MOM to at least the third MOM. Data in the third MOM correlating to the change publication can be updated. The change publication also can be propagated from at least a third MOM to at least a fourth MOM.

A second change resolution including data correlating to a change in data of the third MOM can be automatically propagated from at least a third MOM to a MOM that is a parent of the third MOM where the data can be updated and forwarded to a fourth MOM. The parent object member can update the data in a persistent data store correlating to the change resolution. The second change resolution can be validated before the step of updating data of the parent MOM.

The present invention also relates to a system including a master MOM and at least a second and a third MOM. The second and third MOMs can be initialized from the master MOM, a parent MOM, a backup MOM, or a persistent data store. Further, the second and third MOMs each can have at least a subset of data contained in the master MOM. For example, the second and third MOMs can include all data contained in the master MOM.

A change resolution including data correlating to a change in a device in the software defined radio system can be automatically propagated from the second MOM to the master MOM. The change in the device can be a change in configuration data or a change in a run-time state of the device. A change resolution corresponding to a change in a second device in the system also can be automatically propagated from the third or forth MOM to the master MOM. The change resolution can be propagated to the master MOM or another MOM that is a parent of the third MOM. Data in the master MOM (or parent MOM) correlating to the change resolutions can be updated in response to the change resolutions. As noted, the change resolutions can be validated before data correlating to the change resolutions are updated.

The second MOM and the third MOM each can subscribe to a data topic with the master MOM or with a parent MOM. In one arrangement, at least one of the MOMs can subscribe to the data topic after it is initialized. A change publication including data correlating to the change resolution can be automatically propagated from the master MOM to the third MOM, and data in the third MOM correlating to the change publication can be updated. Further, the change publication can be propagated from the third MOM to at least a fourth MOM. The master MOM can update data correlating to the change resolution in a persistent data store.

DETAILED DESCRIPTION

The present invention relates to a method for automatically updating data encapsulated by a managed object member (MOM) within an object oriented software environment when replicated data encapsulated by another remotely located MOM is changed. The updates can occur as soon as the replicated data changes occur, thus minimizing system latency and insuring system-wide consistency of replicated data within a system. Moreover, since the data updates propagate automatically, polling mechanisms are not required to check for data updates. The elimination of such polling mechanisms minimizes the use of valuable network bandwidth.

Advantageously, to an external entity manipulating the state of a particular node via its corresponding MOM, the system of nodes represented by other MOMs can appear to be self-updating. That is, the external object need not perform any overt action for the data change to be propagated throughout the system. Moreover, the propagation of the data change can occur invisibly from the perspective of the external entity. Accordingly, despite complex structures which may be present in a system, the present invention can help to make the system appear very simple from the perspective of a user and easy to use. Furthermore, when deployment scenarios change in fielded systems, the data updates can be used to implement system configuration changes, whereas hardware or software changes would otherwise be necessary.

Figure 1:
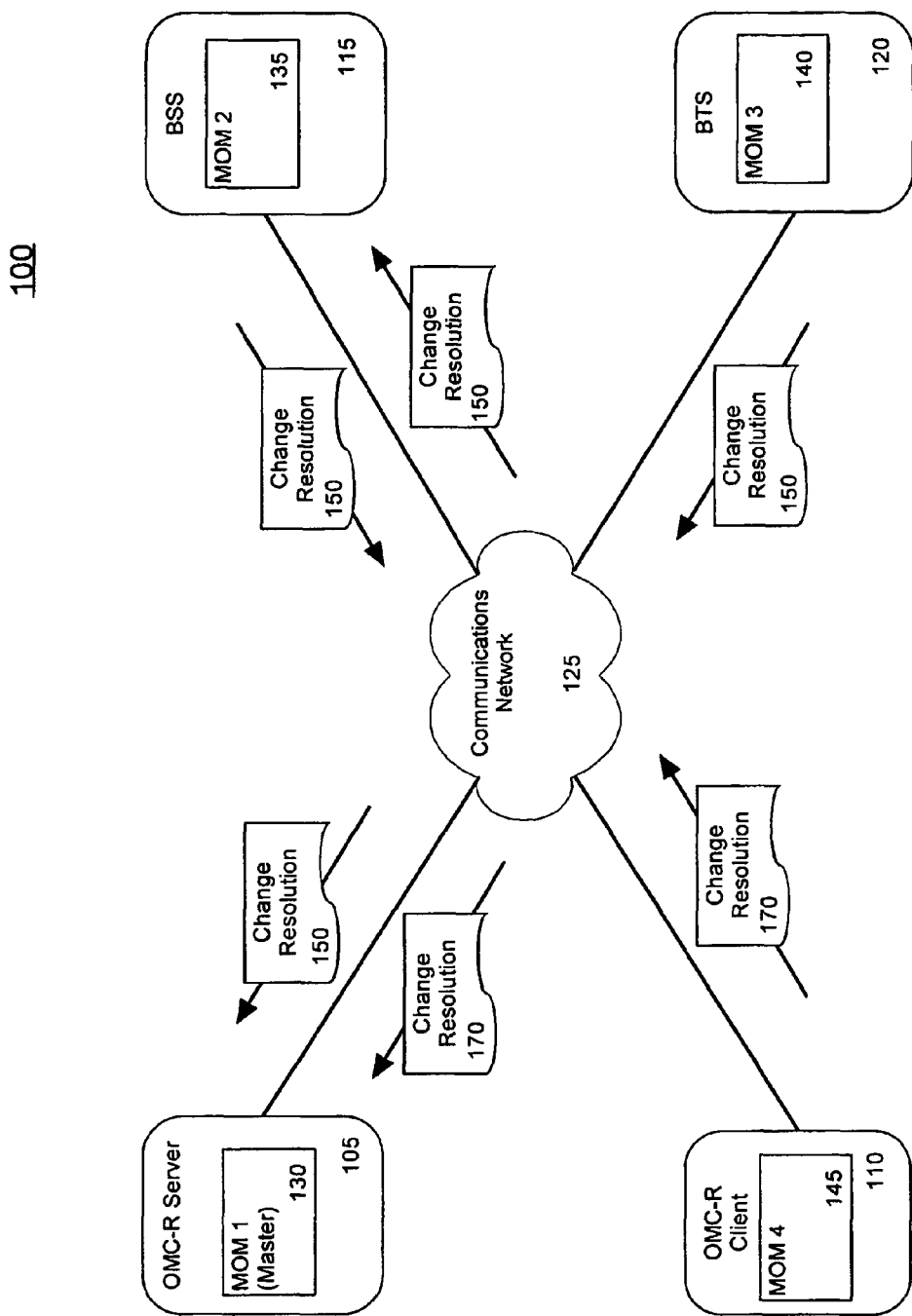
FIG. 1 is a block diagram of a communications system which is useful for understanding the present invention.

A block diagram depicting a communications system 100 which is useful for understanding the present invention is shown in FIG. 1. The communications system 100 can be a communications system that has related objects remotely located with respect to each other. For example, the communications system 100 can be a software defined radio system, a mobile radio communications system, a cellular telephone communications system, a telemetry system, or any other type of communications system having remotely located nodes. The remotely located nodes can include, for example, an operations and maintenance center-radio (OMC-R) server 105, a base station system (BSS) 115, a base transceiver station (BTS) 120, or any other subsystems or devices which can form part of the communications system 100. For instance, the communications system 100 also can include repeaters, additional BSS's, additional BTS's, and so on. Additional support systems also can be provided. For example, an OMC-R client 110 can be associated with the OMC-R server 105. The OMC-R client 110 can have a user interface that allows an operator to view and manipulate the data in the entire system 100.

A communications network 125 can be provided to facilitate communication between nodes of the communication system 100. The communications network 125 can include landlines and/or wireless communications links. In one arrangement, the communications network 125 can provide backhaul links between the nodes of the communications system 100. The nodes of the communications system 100 can communicate among each other using any suitable communications protocol. Examples of a suitable communications protocol are Simple Network Management Protocol (SNMP), Transmission Control Protocol/Internet Protocol (TCP/IP), Internetwork Packet eXchange (IPX) and Link Access Procedure, D channel protocol (LAPD). Still, there are numerous other communications protocols that can be used and the invention is not limited in this regard. Moreover, it should be noted that MOMs may communicate using a different network and a different protocol than the call processing communication of their host nodes. For instance, the BSS and BTS may communicate using LAPD for call processing communication, but use TCP/IP for their MOM to MOM communication.

A managed object member (MOM), for example a first MOM 130, can be instantiated on any of the network nodes, for instance on the OMC-R server 105. One or more additional MOMs also can be instantiated within the communications system 100, for example a second MOM 135 and a third MOM 140. The second MOM 135 and/or third MOM 140 can be instantiated on the same network node as the first MOM 130, or on any other nodes. For instance, the second MOM 135 can be instantiated on the BSS 115 and the third MOM 140 can be instantiated on the BTS 120, as shown. Further, an OMC-R client MOM 145 can be instantiated with the OMC-R client 110.

Figure 3:
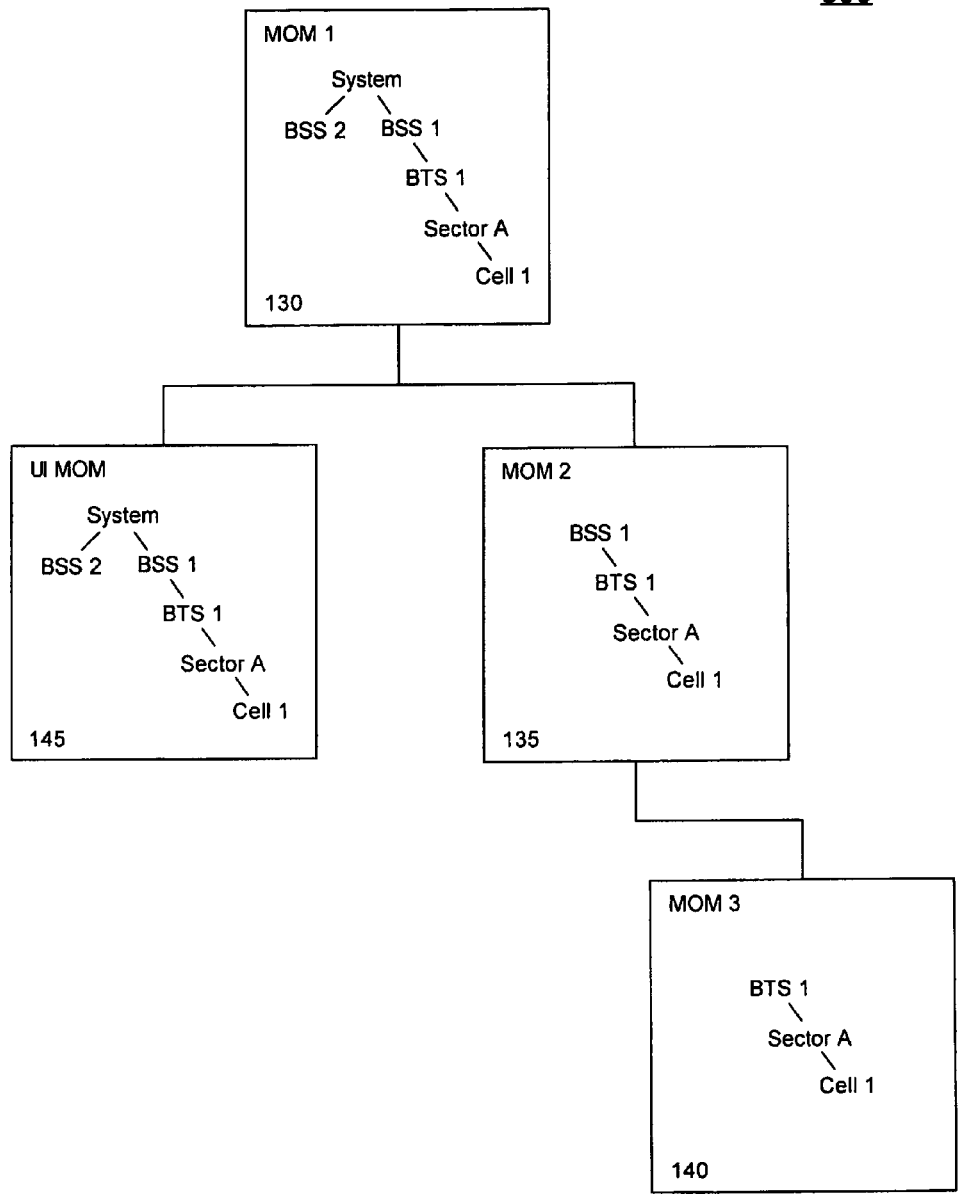
FIG. 3 is a diagram depicting an exemplary managed object member (MOM) hierarchical model which is useful for understanding the present invention.

In one arrangement, a plurality of MOMs can be organized in hierarchical parent-child relationships. Referring to FIG. 3, a diagram is shown depicting an exemplary MOM hierarchical model 300. For example, the first MOM 130 can be a master MOM which is either empty or initialized from a persistent data source, for example a database, a serialized object, a text file, an XML file, or any other file or object to which data can be persisted. For instance, the data source can include a data feed from a designated remote object. When a MOM is empty, either it has no data structures, or it has a complete data structure where each data element is empty or null. The condition of an empty master MOM occurs during a short transient state between start up and before the operation that populates all of its data from its data source. The data populated into the first (master) MOM 130 can be a superset of data correlating to the communications system 100. In particular, the first MOM 130 can be populated with data that may be relevant to the second MOM 135, the third MOM 140, the OMC-R client MOM 145 and, of course, data relevant to the first MOM 130 itself.

One or more other MOMs can be initialized from the master MOM. For example, the second MOM 135 can be initialized from the first MOM 130, in which case the second MOM 135 and OMC-R client MOM 145 can be designated as children to the first MOM 130. Thus, the first MOM 130 can be designated as a parent to the second MOM 135 and the OMC-R client MOM 145, and can serve as a primary data source for the MOMs 135, 145. Similarly, the first MOM 130 also can serve as a primary data source to the third MOM 140. In an alternate arrangement, as shown, the second MOM 135 can serve as the primary data source to the third MOM 140, in which case the first MOM 130 can be viewed as a grandparent to the third MOM 140. In yet another arrangement, the second MOM 135 and/or the third MOM 140 can be initialized from a backup managed object member or a persistent data store. Still, there are an infinite number of hierarchical relationships that can be implemented between MOMs and the invention is not limited in this regard.

In many instances it is not necessary for MOMs below the master MOM in the MOM hierarchy to contain a complete replica of data contained in the master MOM. For example, it may not be necessary that the second MOM 135 maintain specific data associated with a different BSS, whereas such data may need to be maintained by the first MOM 130. Thus, the second MOM 135 can be initialized as a fractional MOM, that is, a MOM having a proper subset of the data contained in the first MOM 130. A fractional MOM can be any MOM other than the master MOM. Further, the third MOM 140 also can be a fractional MOM, initialized from the first MOM 130 or the second MOM 135. Notably, the data set of a fractional MOM need not be a proper subset of the first MOMs data. For example, a fractional MOM may include all of the data that is contained in the master MOM. In some instances a fractional MOM may be temporarily permitted to have elements that are not in the master MOM. This enables equipment to be added to the communications system 100 without necessitating direct manipulation of the master MOM until the change is committed. In this situation, the master MOM can be updated with the new data via a change resolution, which is further discussed below.

To increase reliability and maintainability, a fractional MOM may have two or more initialization data sources. The first data source can be designated as the primary data source and other data sources can be secondary data sources. For example, a fractional MOMs first data source can be its parent MOM, but one or more additional data sources can be used if the parent MOM is unavailable. The one or more additional data sources can be other fractional MOMs having a superset of the required data and/or a local persistent data store.

Because data can be shared among a plurality of MOMs, it can be problematic if the data were to become stale. To insure automatic system-wide consistency of replicated data, as part of its initialization process a child MOM can subscribe to a predetermined publish-enabled MOM, which is a MOM with which the child MOM can exchange data updates. In particular, the child MOM can subscribe to one or more topics associated with the publish-enabled MOM. The child MOM can subscribe to the topics at the time the child MOM is initialized or anytime thereafter. For example, if a particular topic is not available at the time the child MOM is initialized, the child MOM can subscribe to the topic when the topic becomes available. For instance, the child MOM can periodically attempt the subscription process until a successful subscription is achieved. The publish-enabled MOM can send an acknowledgement to the child MOM at such time to verify that the topic subscribed was successful. In a typical arrangement, the publish-enabled MOM will be a parent MOM. However, the publish-enabled MOM also can be a master MOM, or another publish-enabled MOM having a superset of the child MOMs data.

Subscription data topics allow publish-enabled MOMs to determine a set of subscribers that should receive a particular publication. They can be as fine or course grained as required, but generally include logical identifiers of each subscriber MOM, or each node represented by a subscriber MOM. MOM data topics should be sufficiently fine-grained to prevent subscribers from receiving unwanted changes.

The publish-enabled MOM can use these identifiers to publish a message to appropriate subscribers. For instance, a MOM for a first BTS node typically would not be interested in data changes to another BTS node. Thus, the MOM associated with the first BTS may subscribe to topics applicable only to the first BTS. Accordingly, the MOM associated with the first BTS only would be informed of data changes which are applicable to the first BTS, significantly reducing the number of unnecessary messages that are sent.

A plurality of subscriber MOMs can subscribe to a publish-enabled MOM so that the publish-enabled MOM can keep track of subscribers which subscribe to it. For instance, the publish-enabled MOM can store references to the subscribers within the publish-enabled MOM itself. In another arrangement, an associative look-up table can be used to maintain the mapping of subscribers to the publish-enabled MOM. The look-up table can be, for example, a hash table, a text file, or any other data structure that can be used to associate one or more subscribers with the topics of interest. In one arrangement, the references to the child MOMs can be added to the look-up table when the child MOMs are instantiated. If the parent MOM is not available at the time of instantiation, the child MOM may subscribe after the parent MOM becomes available. Additionally, child MOMs can be added to the look-up table using any one of a variety of techniques, and the invention is not so limited.

When specific data within the publish-enabled MOM changes, the publish enabled MOM can send data updates—referred to as change publications—to MOMs subscribed to the data topic that correlates to the changed data. A MOM receiving a change publication can, by default, update itself using the updated data and persist the data locally, if necessary. The change publications can have sufficient information for the receiver to change its state, or invite the receiver to retrieve the necessary updated data from the publish-enabled MOM, or any other object where the data change can be stored. For example, a publish-enabled MOM can be predisposed to insert changed data into a change publication each time a change within the publish-enabled MOM occurs. Alternatively, the publish-enabled MOM can insert into the change publication the location where the updated data can be found. The publish-enabled MOM then can forward the change publication to any subscribers contained in the look-up table associated with the data that has been changed. A change publication is not subject to review and cannot be rejected by a recipient, although it can be ignored.

A change publication that does not change the value of any data item in the receiving MOM can be safely ignored. As defined herein, ignoring a change publication means not updating the affected data and not re-publishing the publication if the MOM receiving the change publication is publish-enabled. There are a variety of ways in which a MOM receiving a change publication that represents a change in value of one or more data items can handle the change publication. For instance, the receiving MOM can update the affected data and, if the receiving MOM is publish-enabled, republish the publication. If the receiving MOM considers some of the data items in the publication as immutable, it can attempt to correct the error and avoid data inconsistency that would otherwise result. For example, the receiving MOM can send a change resolution to its parent MOM requesting changes to one or more data items in the original publication. Alternatively, the MOM can simply report the error.

A subscriber MOM can have a subscriber interface to facilitate the process of receiving change publications. For example, the subscriber interface can comprise one or more functions that enable a subscriber MOM to receive change publications, extract data that has been updated or retrieve the data from an identified location, and incorporate the updated data within the subscriber MOM.

In contrast to a change publication, a change resolution can be a data update propagated from a child MOM to its parent MOM. When a change resolution is received by a MOM, the change can be validated and forwarded up the MOM hierarchy until the master MOM is reached. When the change resolution reaches the master MOM, the data updates can be committed and corresponding change publications can be sent. Change resolutions can be validated as appropriate before being forwarded or committed. For example, a change resolution may be rejected if there is a problem locating or querying the persistent data source having the data intended to be updated, the change resolution attempts to update a non-existent node, the change resolution attempts to update a parameter outside its valid range, or the change resolution would violate an established rule. Additionally, a MOM receiving a change resolution can query a MOM affected by the change resolution and the MOM receiving the change resolution can request that the change resolution be verified before persisting the change. This verification process can be beneficial in the instance that another MOM can detect problems not detectable by the MOM receiving the change resolution. Alternatively, a particular change may be unconditionally accepted. For instance, runtime states of a device may be more properly treated as telemetry rather than a change that can be rejected. Change resolutions containing data that would not need to be verified can be unconditionally accepted.

Figure 2:
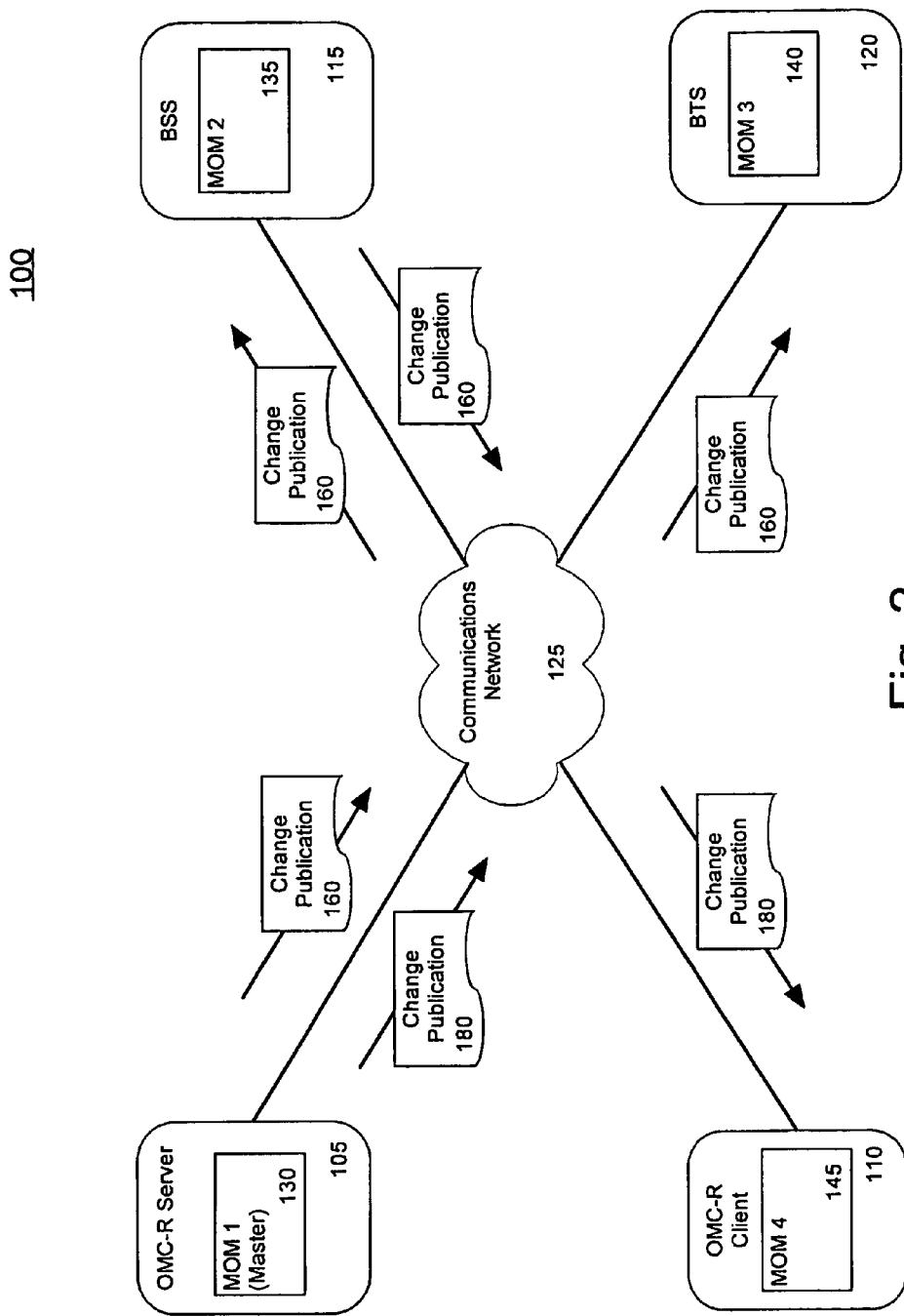
FIG. 2 also is a block diagram of a communications system which is useful for understanding the present invention.

Referring again to FIG. 1 and to FIG. 2, exemplary MOM update operations will now be described. In a first example, a data change can occur in a MOM within the communications system 100. For instance, configuration data or run-time states of the BTS 120, or a device within the BTS, can change. Such a change can cause a data change to occur in the third MOM 140. When such a data change occurs, the third MOM 140 can automatically propagate a change resolution 150 directly to the first MOM 130. If the change resolution 150 is subject to verification by the first MOM 130, the first MOM 130 can verify the change, and reject the change if necessary. In this arrangement, the second MOM 135 can await a change publication 160 from the first MOM 130 before committing the update to itself.

In an alternate arrangement, the third MOM 140 can automatically propagate a change resolution 150 to the second MOM 135. If the change resolution 150 is subject to verification by the second MOM 135, the second MOM 135 can verify the change, and reject the change if necessary. If the change resolution 150 is not rejected by the second MOM 135, the change resolution 150 can be forwarded to the first MOM 130.

If the change resolution 150 is subject to verification by the first MOM 130, the second MOM 135 can pass the change resolution 150 to the first MOM 130 without updating itself. For example, the second MOM 135 can wait to receive from the first MOM 130 a verification of the change resolution 150 or a correlating change publication 160. However, if the change resolution 150 contains time critical updates, for example those that affect call processing, the second MOM 135 can update itself immediately and then forward the change resolution to the first MOM 130. If the second MOM 135 receives a subsequent change publication 160 correlating to the change resolution 150 and discovers that the publication does not change the value of any data item (since those changes have already been made) the second MOM 135 can ignore the change publication 160.

If the change resolution 150 is accepted by the first MOM 130, the first MOM's persisted data correlating to the change resolution 150 can be updated. Further, data correlating to the change resolution 150 that is cached in a temporary storage location, such as random access memory (RAM), can be updated. A correlating change publication 180 also can be propagated from the first MOM 130 to other MOMs that are subscribing to the MOM data topic to which the change publication pertained.

In another example, a change resolution 170 can be sent from the OMC-R client MOM 145 to the first MOM 130 in response to a user requested data update. If the change resolution 170 is not rejected by the first MOM 130, the first MOM 130 can update itself and propagate a change publication 160 to MOMs subscribing to the change topic. For instance, the change publication 160 can be forwarded to the second MOM 135. The second MOM 135 can update itself and then forward the change publication 160 to the third MOM 140. Alternatively, if the first MOM 140 is subscribed to an appropriate data topic with the first MOM 130 instead of second MOM 135, the first MOM 130 can forward the change publication 160 simultaneously to the second MOM 135 and the third MOM 140. At this point, it should be noted that in addition to the specific examples contained herein, change resolutions may be initiated by changes in actual equipment. For example, if an equipment failure occurs resulting in a change in the configuration or run-time state of a particular MOM, a change resolution can be generated.

The MOMs 130, 135, 140, 145 can communicate using middleware, which is a layer of software above the operating system but below the application program. Middleware provides a common programming abstraction and messaging services across a distributed system to facilitate communications between different applications and/or objects within the communications system 100, as would be known to those skilled in the art of network architecture. Examples of middleware are common object request broker architecture (CORBA), Java remote method invocation (RMI), Sockets (datagram, stream and raw), hypertext transfer protocol (HTTP), common gateway interface (CGI), Caffeine, Distributed Component Object Model (DCOM), and so on.

Because the MOMs 130, 135, 140 can be automatically updated whenever a change in a related MOM occurs, replicated data is always consistent and the risk of system errors due to stale data is minimized. Moreover, the risk of losing data due to equipment failure is virtually eliminated. Additionally, the MOMs 130, 135, 140 appear self-managing from the viewpoint of other entities using them. Accordingly, through a user interface on the OMC-R, an operator can change the configuration of any equipment in the communications system 100 and observe the health and status of the system in real time, without the necessity of waiting for system updates.

Figure 4:
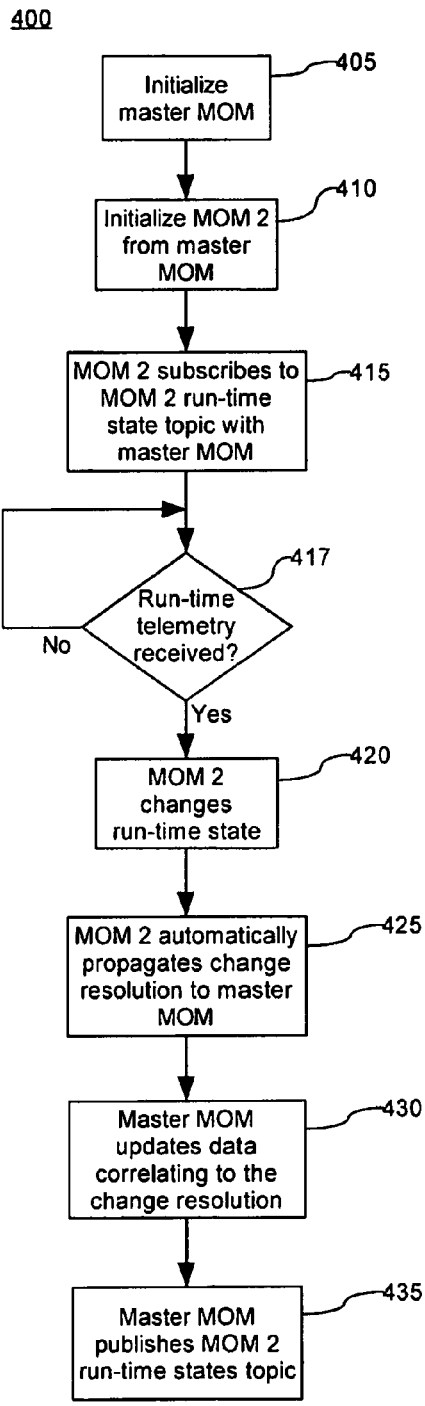
FIG. 4 is a flow chart which is useful for understanding the present invention.

Referring to FIG. 4, a flow chart 400 is shown which describes the basic change resolution process. Beginning at step 405, a master MOM can be initialized. A second MOM (MOM 2) also can be initialized from the master MOM, as shown in step 410, and MOM 2 can subscribe to a "MOM 2 configuration" topic with the master MOM, as shown in step 415. Referring to decision box 417, the system can remain quiet until a run-time telemetry event occurs. When run-time telemetry is received, MOM 2 can change its run-time state, as shown in step 420, and a correlating change resolution can be automatically propagated from MOM 2 to the master MOM, as shown in step 425. At step 430, the master MOM can update data correlating to the change resolution.

Continuing to step 435, the master MOM can publish the topic pertaining to the run-time states of MOM 2. It should be noted that in this scenario MOM 2 need not receive the publication since it is subscribed to MOM 2 configuration topics, not "MOM 2 run-time states." However, a typical OMC-R client could receive the publication if it is subscribed to a topic of "all MOMs, all states," for instance. Thus, the system architect can use topics of sufficient granularity to minimize unnecessary messaging.

Figure 5:
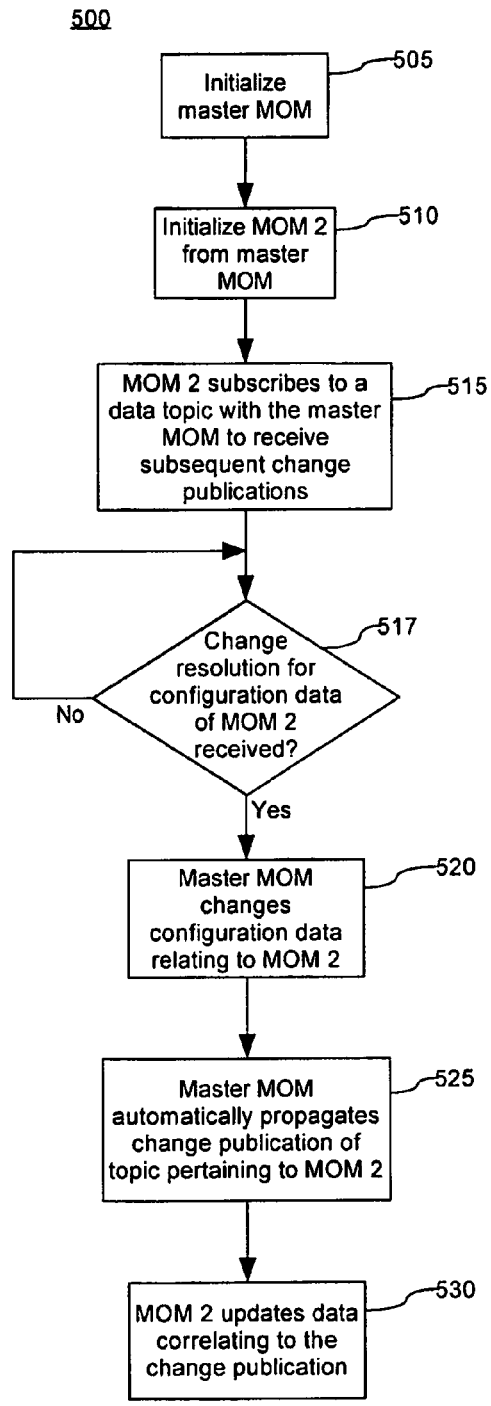
FIG. 5 is another flow chart which is useful for understanding the present invention.

Referring to FIG. 5, a flow chart 500 is shown which describes the basic change publication process. Beginning at step 505, a master MOM can be initialized. A second MOM (MOM 2) also can be initialized from the master MOM, as shown in step 510, and MOM 2 can subscribe to a "MOM 2 configuration" data topic with the master MOM to receive subsequent change publications, as shown in step 515. Referring to decision box 517, the system can remain quiet until a change resolution pertaining to MOM 2 configuration data is received by the master MOM from MOM-OMC-R. When the MOM 2 configuration data is received, the master MOM can change configuration data relating to the topic to which the MOM 2 subscribed, as shown in step 520. Proceeding to step 525, the master MOM can automatically propagate a correlating change publication pertaining to the topic "MOM 2 configuration." The data in MOM 2 which correlates to the received change publication then can be updated, as shown in step 530.

The present invention can be realized in hardware, software, or a combination of hardware and software. The present invention can be realized in a centralized fashion in one software defined radio system, or in a distributed fashion where different elements are spread across several interconnected software defined radio systems. Any kind of software defined radio system or other apparatus adapted for carrying out the methods described herein is suited. A typical combination of hardware and software can be a software defined radio system with an application program that, when being loaded and executed, controls the software defined radio system such that it carries out the methods described herein.

The present invention also can be embedded in an application program product, which comprises all the features enabling the implementation of the methods described herein, and which when loaded in a software defined radio system is able to carry out these methods. An application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A communication system configured with a managed object member (MOM) architecture to manage a flow of information in an object oriented software environment, comprising:
   a first remote node comprising a memory and a first MOM in the MOM architecture, wherein the first MOM is configured to encapsulate data; and
   a second remote node comprising a memory and a second MOM in the MOM architecture, wherein the second MOM is configured to encapsulate data;
   wherein the first remote node and the second remote node are configured for remote-node-to-remote-node communication processing via a first communications protocol, and for transfer of encapsulated data between the first MOM and the second MOM via a second communications protocol in the object oriented software environment; and
   wherein the first communications protocol is different than the second communications protocol.

2. The communication system of claim 1, wherein the first communications protocol is at least one of a link access procedure-D channel protocol (LAPD), a transmission control protocol/internet protocol (TCP/IP), a simple network management protocol (SNMP), or an internetwork packet exchange (IPX).

3. The communication system of claim 1, wherein the first remote node and the second remote node are configured to communicate via a landline and wherein the first MOM and the second MOM are configured to communicate via a wireless communication link.

4. The communication system of claim 1, wherein the first remote node and the second remote node are configured to communicate via a wireless communication link and wherein the first MOM and the second MOM are configured to communicate via a landline.

5. The communication system of claim 1, wherein the communication system is at least one of a software defined radio system, a mobile radio communication system, a cellular telephone communication system, or a telemetry system.

6. The communication system of claim 1, wherein at least one of the first remote node or the second remote node is at least one of an operations and maintenance center-radio (OMC-R) server, an OMC-R client, a base station system, or a base transceiver station.

7. The communication system of claim 1, further comprising a master remote node comprising a memory and a master MOM in the MOM architecture;
wherein the master MOM comprises a master data structure with master data elements; and
wherein the master data structure comprises a complete data set of the communication system.

8. The communication system of claim 7, wherein the first MOM comprises a temporary data structure configured to store update data, and wherein the second remote node is configured to communicate the update data to the first remote node.

9. The communication system of claim 8, wherein the first MOM is configured to delete the temporary data structure in response to transmitting the update data to the master remote node.

10. The communication system of claim 9, wherein the temporary data structure is configured to store at least a portion of the update data in an update data element that is different than the master data elements of the master data structure.

11. A method for managing a flow of information in an object oriented software environment of a communication system configured with a managed object member (MOM) architecture, comprising:
remote-node-to-remote-node communication processing, via a first communications protocol, between a first remote node comprising a first MOM in the MOM architecture and a second remote node comprising a second MOM in the MOM architecture, wherein the first MOM and the second MOM are configured to encapsulate data; and
transferring encapsulated data between the first MOM and the second MOM via a second communications protocol in the object oriented software environment;
wherein the first communications protocol is different than the second communications protocol.

12. The method of claim 11, further comprising storing update data in a temporary data structure in the first MOM, wherein the update data is received from the second remote node.

13. The method of claim 12, further comprising deleting the temporary data structure in response to transmitting the update data to a master remote node in the communication system.

14. The method of claim 13,
wherein the master remote node comprises a master MOM in the MOM architecture;
wherein the master MOM comprises a master data structure with master data elements; and
wherein the master data structure comprises a complete data set of the communication system.

15. The method of claim 14, wherein the temporary data structure is configured to store at least a portion of the update data in an update data element that is different than the master data elements of the master data structure.

16. The method of claim 15, further comprising validating the update data at the first remote node prior to transmitting the update data to the master remote node.

17. The method of claim 16, further comprising updating the master data structure with the update data in response to validating the update data at the master remote node.

18. The method of claim 17, further comprising initializing a third MOM in the MOM architecture in a third remote node.

19. A non-transitory computer readable medium having instructions stored thereon that, when executed by a computing device, cause the computing device to perform operations comprising:
remote-to-remote-node communication processing in a communication system configured with a managed object member (MOM) architecture, via a first communications protocol, between a first remote node comprising a first MOM in the MOM architecture and a second remote node comprising a second MOM in the MOM architecture, wherein the first MOM and the second MOM are configured to encapsulate data; and
transferring encapsulated data between the first MOM and the second MOM via a second communications protocol in an object oriented software environment of the communication system;
wherein the first communications protocol is different than the second communications protocol.

20. The non-transitory computer readable medium according to claim 19, further having instructions stored thereon that, when executed by the computing device, cause the computing device to perform further operations comprising:
storing update data in a temporary data structure in the first MOM, wherein the update data is received from the second remote node; and
deleting the temporary data structure in response to transmitting the update data to a master remote node in the communications system;
wherein the master remote node comprises a master MOM in the MOM architecture; wherein the master MOM comprises a master data structure with master data elements; wherein the master data structure comprises a complete data set of the communication system; and
wherein the temporary data structure is configured to store at least a portion of the update data in an update data element that is different than the master data elements of the master data structure.

* * * * *